United States Patent [19]
Ackerman et al.

[11] 3,920,870
[45] Nov. 18, 1975

[54] DECORATIVE PLACEMAT CONSTRUCTION WITH A GRAPHIC PATTERN INSERT

[75] Inventors: Don Ackerman, Scotch Plains, N.J.; Robert Ira Schwartztol, Brooklyn Heights, N.Y.

[73] Assignee: PerCare, Inc., Roselle, N.J.

[22] Filed: Jan. 18, 1974

[21] Appl. No.: 434,694

[52] U.S. Cl. ............... 428/46; 156/202; 206/45.33; 229/80; 428/121; 428/346; 428/911
[51] Int. Cl.².. B32B 3/02; B32B 3/04; B65D 27/14; B65D 65/18
[58] Field of Search.................... 206/45.33; 229/80; 161/43–45, 167, 406, 99; 156/202

[56] References Cited
UNITED STATES PATENTS

| | | | |
|---|---|---|---|
| 3,637,454 | 1/1972 | Pavernick | 161/44 |
| 3,675,844 | 7/1972 | Sorrell | 229/80 |
| 3,819,106 | 6/1974 | Schuster | 229/80 X |

*Primary Examiner*—Philip Dier
*Attorney, Agent, or Firm*—Stephen B. Judlowe

[57] ABSTRACT

Improved placemat apparatus comprises a compliant opaque backer sheet formed of foamed polyvinyl chloride, and a clear transparent overlay sheet, e.g., of vinyl, disposed over the backer and secured on three sides thereto, as by thermowelding, to fuse the contiguous backer and overlay plastic materials.

A graphics sheet desired by a consumer, e.g., a wallpaper or fabric segment, is inserted between the backer and overlay, and enclosed by securing a flap-like member affixed to the overlay to the backer sheet. A double sided acrylic copolymer adhesive strip is advantageously utilized to secure the flap and backer sheet.

6 Claims, 3 Drawing Figures

16
DECORATIVE PLACEMAT CONSTRUCTION WITH A GRAPHIC PATTERN INSERT

DISCLOSURE OF INVENTION

This invention relates to household consumer apparatus and, more specifically, to improved, decorative placemats, and to the method of forming such placemats.

It is an object of the present invention to provide improved table placemats.

More specifically, it is an object of the present invention to provide placemats which visually present any desired graphic material — e.g., a wallpaper pattern, fabric design or the like for overall room coordination, the display being protected.

The above and other objects of the present invention are realized in a specific, illustrative placemat construction comprising a compliant backer sheet with an opaque upper surface, e.g., formed of foamed polyvinyl chloride. A clear plastic, e.g., vinyl, is initially secured about three sides of the backer, as a by a thermoweld.

To complete the placemat, a sheet with a desired graphic pattern, e.g., a wallpaper segment, is inserted between the backer and transparent covering sheet, and a previously open, flap-like member (as of white vinyl) affixed to the clear cover sheet is secured to the backer to completely encapsulate the graphic-bearing insert (i.e., the wallpaper). An initially protected double sided adhesive, as of an acrylic copolymer and synthetic resin, is employed to secure the flap and backer sheet.

Accordingly, the basic placemat construction has universal application — and retail merchants need store only one version (for any given physical size), consumers (or, as a service, vendors) merely inserting the desired graphics to suit all diverse customer requirements.

The above and other features and advantages of the present invention will become more clear from the following detailed description thereof presented hereinbelow in conjunction with the accompanying drawing in which.

Figure 1:
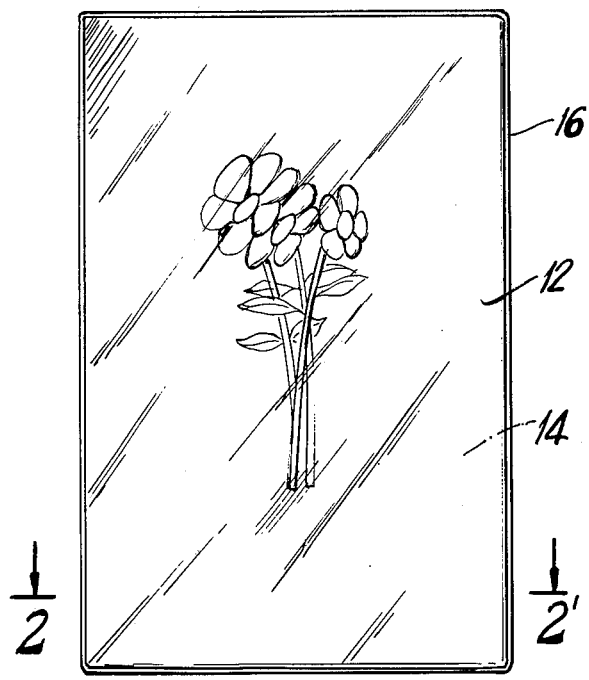
FIG. 1 is a front plan view of a completed placemat embodying the principles of the present invention.
Figure 2:
FIG. 2 is a cross-section taken at section 2—2' of FIG. 1.

Referring now to the drawing, there is shown a composite placemat which includes a compliant, opaque backer sheet 10, for example, formed of a foamed polymer, such as foamed polyvinyl chloride. The backer sheet 10, as for the composite placemat arrangement, may assume any desired configuration, more typically the rectangular shape shown in the drawing.

Disposed over the backer sheet 10 is a transparent plastic overlay sheet 12. The overlay sheet 12 may advantageously be formed of a clear plastic such as vinyl.

In the initial preparation of the placemat arrangement, the vinyl sheet 12 is secured to the backer sheet 10 about three sides thereof, the junction therebetween being a narrow border 16 about the periphery of the sheets 12 and 10. The sheets may be secured by an adhesive or, in accordance with the preferred embodiment of the present invention, by a fusing of the plastics 10 and 12 as by thermowelding, effected by the coincident application of heat and pressure, transversely directed sonic energy, or the like.

Figure 3:
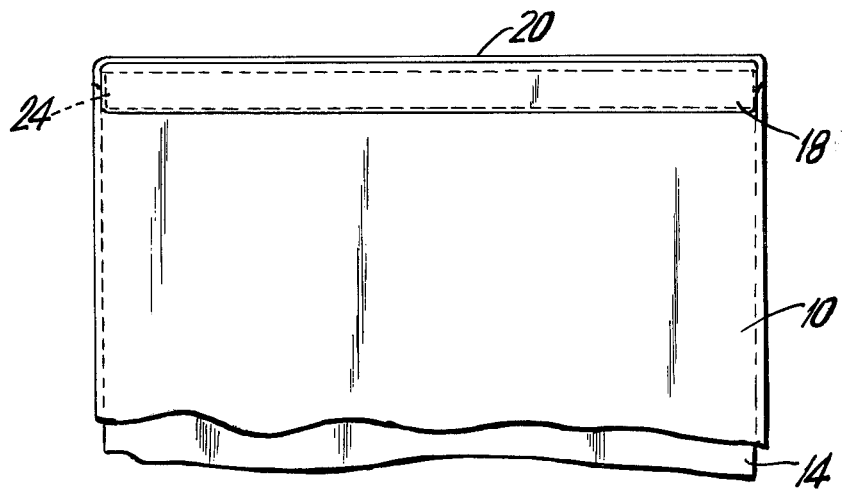
FIG. 3 is a partial rear plan view of the placemat embodying the principles of the present invention.

In its initial construction, a flap 18 (see FIG. 3) is secured via a common border 20 to the upper edge of the vinyl, also by an adhesive or thermowelding, the flap initially being openable. Disposed beneath the flap 18 (and adhered to either the flap 18 or the sheet 10) is a strip 24 of a double sided adhesive. In accordance with the preferred embodiment of the present invention, the adhesive comprises a blend of an acrylic copolymer with any suitable synthetic resin. The double sided adhesive strip 24 is secured on one side to the backer sheet 10 (or the flap 18 as noted above), but has its upper side protected by a paper strip to which it will not adhere, e.g., a waxed paper.

When the placemat blank above described is to be impressed into service, a user obtains a sheet 14 having desired aesthetic graphics, conforming the size of that sheet to the interior of the envelope-like structure defined by the three sided closure between the sheets 10 and 12. The user then simply inserts the graphic sheet material 14 into such envelope-like structure, and then peals the protective covering from the upper surface of the double sided adhesive strip 14. Finally, the flap 18 is pressed against (and is thereafter retained by) the upper surface of the adhesive strip 24. The graphic sheet 14 is thus secured within the composite placemat arrangement, with the desired graphics viewable through the clear covering sheet 12. The adhesive above described will securely retain the flap 18 over a prolonged period of time and in unfavorable environmental conditions should the mat ever be exposed thereto.

It will therefore be appreciated that the placemat arrangement of the instant invention thus provides the consumer with the ability to have a uniquely styled placemat by selecting an appropriate graphic sheet 14, such as a wallpaper segment, cloth furniture covering segment, or the like to conform to and be a contributing part of a dining room decor; while the vending merchant need stock only one form of placemat blank for each placemat size to satisfy all individual consumer tastes.

The above described arrangement is merely illustrative of the principles of the present invention. Numerouss modifications and adaptations thereof will be readily apparent to those skilled in the art without departing from the spirit and scope of the present invention.

What is claimed is:

1. In combination in a placemat, an opaque compliant backer sheet, a clear overlay sheet, means securing said overlay sheet and said backer sheet about less than all the periphery thereof, graphic bearing sheet means disposed between said backer and overlay sheet with said graphics disposed toward said overlay sheet, flap member means secured to said clear overlay sheet about the portion of the periphery thereof where said overlay sheet and said opaque backer are not secured, and double sided adhesive strip means secured to the surface of one of said opaque compliant backer sheet remote from said clear overlay sheet and said flap member, and disposed in proximate relation to said flap member.

2. A combination as in claim 1 wherein said securing means comprises a thermally fused portion of said overlay and said opaque compliant backer sheet.

3. A combination as in claim 2 wherein said opaque backer sheet comprises foamed polyvinyl chloride.

4. A combination as in claim 3 wherein said clear overlay sheet comprises vinyl.

5. A combination as in claim 4 wherein said double sided adhesive comprises a mixture of an acrylic copolymer and synthetic resin.

6. A combination as in claim 5 wherein said flap member comprises white vinyl.

\* \* \* \* \*